United States Patent
Atkins et al.

(10) Patent No.: US 8,786,485 B2
(45) Date of Patent: Jul. 22, 2014

(54) MOBILE COHERENT CHANGE DETECTION GROUND PENETRATING RADAR

(75) Inventors: Robert George Atkins, Lexington, MA (US); Justin John Brooke, Cambridge, MA (US); Matthew Tyler Cornick, Woburn, MA (US); Beijia Zhang, Cambridge, MA (US)

(73) Assignee: Masachusetts Institute of Technology, Cambridge, MA (US)

( * ) Notice: Subject to any disclaimer, the term of this patent is extended or adjusted under 35 U.S.C. 154(b) by 506 days.

(21) Appl. No.: 13/221,233

(22) Filed: Aug. 30, 2011

(65) Prior Publication Data

US 2013/0050008 A1    Feb. 28, 2013

(51) Int. Cl.
| | | |
|---|---|---|
| *G01S 13/00* | (2006.01) | |
| *G01S 7/295* | (2006.01) | |
| *G01S 13/89* | (2006.01) | |
| *G01S 13/88* | (2006.01) | |

(52) U.S. Cl.
CPC .............. *G01S 13/89* (2013.01); *G01S 7/295* (2013.01); *G01S 13/885* (2013.01)
USPC ........ 342/22; 342/25 R; 342/25 A; 342/25 B; 342/189

(58) Field of Classification Search
USPC .......... 342/22, 25 R, 25 A, 25 B, 25 C, 25 D, 342/25 E, 25 F, 175, 189; 343/824, 825–827, 343/844
See application file for complete search history.

(56) References Cited

U.S. PATENT DOCUMENTS

| | | | | |
|---|---|---|---|---|
| 5,247,302 | A * | 9/1993 | Hughes | 342/22 |
| 5,499,029 | A * | 3/1996 | Bashforth et al. | 342/22 |
| 5,502,444 | A * | 3/1996 | Kohlberg | 342/22 |
| 5,557,277 | A * | 9/1996 | Tricoles et al. | 342/22 |
| 5,673,050 | A * | 9/1997 | Moussally et al. | 342/22 |
| 5,912,639 | A * | 6/1999 | Beckner | 342/22 |
| 5,952,954 | A * | 9/1999 | Beckner | 342/22 |
| 6,091,354 | A * | 7/2000 | Beckner et al. | 342/22 |
| 6,140,959 | A * | 10/2000 | Gudat et al. | 342/357.25 |
| 6,445,334 | B1 * | 9/2002 | Bradley et al. | 342/22 |
| 6,453,058 | B1 * | 9/2002 | Murthy et al. | 382/128 |

(Continued)

OTHER PUBLICATIONS

Price, Gary H.; "Change detection as a tool for the maintenance of mine-free trackways using a forward-looking ground-penetrating radar"; Proceedings of SPIE, vol. 4038, 2008; pp. 1383-1391.

(Continued)

*Primary Examiner* — Peter Bythrow
(74) *Attorney, Agent, or Firm* — Schmeiser, Olsen & Watts LLP; William G. Guerin

(57) ABSTRACT

Described are a method and system for detecting and locating changes in an underground region. Changes are detected using a mobile coherent change detection ground penetrating radar (GPR). The GPR system is located on a mobile platform that makes two more measurement passes over the same route to acquire GPR images of an underground region at different times. A lateral offset between the GPR images for the two different times is determined and applied to one of the GPR images to generate a GPR shifted image that is spatially aligned with the other GPR image using a correlation process or other technique. A GPR difference image is generated from the GPR shifted image and the other GPR image. The GPR difference image includes data representative of changes to the underground region that occurred between the two measurement passes.

11 Claims, 5 Drawing Sheets

(56) References Cited

U.S. PATENT DOCUMENTS

| | | | |
|---|---|---|---|
| 6,462,696 B1* | 10/2002 | Gorman | 342/22 |
| 6,501,414 B2* | 12/2002 | Arndt et al. | 342/22 |
| 7,362,260 B2* | 4/2008 | Cloutier et al. | 342/127 |
| 7,479,918 B2* | 1/2009 | Johnson et al. | 342/22 |
| 7,675,289 B1* | 3/2010 | Stolarczyk et al. | 324/334 |
| 7,788,793 B2* | 9/2010 | Wichmann | 29/600 |
| 8,040,272 B1* | 10/2011 | Clodfelter et al. | 342/22 |
| 8,508,402 B2* | 8/2013 | Duran Toro et al. | 342/22 |
| 2006/0077095 A1* | 4/2006 | Tucker et al. | 342/357.08 |
| 2006/0271298 A1* | 11/2006 | MacIntosh et al. | 702/5 |
| 2008/0092364 A1* | 4/2008 | Wichmann | 29/600 |
| 2008/0117098 A1* | 5/2008 | Johnson et al. | 342/25 F |
| 2008/0246647 A1* | 10/2008 | Hellsten | 342/22 |
| 2009/0109081 A1* | 4/2009 | Ryerson et al. | 342/22 |
| 2010/0052969 A1* | 3/2010 | Niktash | 342/22 |
| 2010/0052970 A1* | 3/2010 | Moussally et al. | 342/22 |
| 2010/0259438 A1* | 10/2010 | Jones et al. | 342/22 |
| 2011/0037639 A1* | 2/2011 | Duran Toro et al. | 342/22 |
| 2011/0128179 A1* | 6/2011 | Apostolos et al. | 342/22 |
| 2012/0133543 A1* | 5/2012 | Al-Khalefah et al. | 342/22 |
| 2012/0242341 A1* | 9/2012 | Olsson et al. | 324/326 |
| 2012/0274330 A1* | 11/2012 | Kesar et al. | 324/338 |

OTHER PUBLICATIONS

Sadjadi, Firooz et al.; "Detection of Buried Objects using GPR Change Detection in Polarimetric Huynen Spaces"; IEEE 2008; 6 pages.

* cited by examiner

MOBILE COHERENT CHANGE DETECTION GROUND PENETRATING RADAR

GOVERNMENT RIGHTS IN THE INVENTION

This invention was made with government support under grant number FA8721-05-C-0002, awarded by the Air Force. The government has certain rights in this invention.

FIELD OF THE INVENTION

The present invention relates generally to ground penetrating radar. More particularly, the invention relates to a coherent change detection ground penetrating radar.

BACKGROUND OF THE INVENTION

Ground penetrating radar (GPR) systems are capable of detecting buried metal and non-metal objects, such as rocks, boulders and roots that are present below the ground surface. In addition, GPR systems can detect discontinuities and gradients in the dielectric properties of the soil due, for example, to soil layering, air voids, heterogeneous soil composition and moisture content. Air voids include tunnels, caves and other extended man-made and natural structures that form a void.

Many GPR systems are clutter-limited. Often, detection of only one type of feature is desired. In these instances all other surface and buried features are considered to be clutter. If the feature to be detected exhibits change over time, the feature can be separated from clutter features through change detection processing. In some applications, observations of an underground region are desired at widely separated times. Components of such systems can be sensitive to temperature variation; therefore change detection processing applied to measurements widely separated in time can yield poor results.

Many GPR systems are designed for stationary operation; however, in some applications, measurements of a large underground region or track are required therefore operation from a moving platform is desirable. Application of change detection processing to data acquired from a mobile GPR system using different measurement passes is prohibited by the inability to transport the GPR antenna system over the underground region in a near-identical manner for each measurement pass.

SUMMARY

In one aspect, the invention features a system for detecting and locating changes in an underground region. The system includes a mobile GPR system, a radar processor in communication with the GPR system, and a registration module in communication with the radar processor. The mobile GPR system has a linear array of antenna elements. Each antenna element is configured to transmit a radar signal into an underground region and to receive a return radar signal from the underground region. The electromagnetic field generated by each antenna element during transmission is substantially the same as the electromagnetic field generated by each of the other antenna elements during transmission. The antenna receive pattern of each antenna element during reception is substantially the same as the antenna receive pattern of each of the other antenna elements during reception. The radar processor is configured to generate a GPR image of an underground region. The registration module is configured to determine a lateral offset of the linear array between a pass over the underground region at a first time and a pass over the underground region at a second time. The registration module is configured to spatially align a GPR image acquired for the first time and a GPR image acquired for the second time, and to generate a GPR difference image based on the spatially aligned GPR images. The GPR difference image includes data representative of changes to the underground region that occur between the first and second times.

In another aspect, the invention features a method for determining a change to an underground region. The method includes acquiring a GPR image of an underground region at a first time and acquiring a GPR image of the underground region at a second time. A lateral offset between the GPR images at the first and second times is determined and applied to one of the GPR images to generate a GPR shifted image. A GPR difference image is generated based on the GPR shifted image and the other of the GPR images. The GPR difference image includes data representative of changes to the underground region that occur between the first time and the second time.

In still another aspect, the invention features an apparatus for detecting and locating changes in an underground region. The apparatus includes a linear array of antenna elements. Each antenna element is configured to transmit a radar signal into an underground region and to receive a return radar signal from the underground region. The electromagnetic field generated by each antenna element during transmission is substantially the same as the electromagnetic field generated by each of the other antenna elements. The antenna receive pattern of each antenna element during reception is substantially the same as the antenna receive pattern of each of the other antenna elements. The apparatus also includes an enclosure substantially surrounding the linear array of antenna elements. The enclosure includes a material that attenuates radiation emitted from the antenna elements during transmission. The enclosure is configured to pass the radar signals from the antenna elements and to pass the return radar signals from the underground region.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

According to various embodiments, changes are detected in an underground region using mobile coherent change detection GPR. By way of examples, changes may be due to recently buried items, changes in soil moisture content, newly formed voids, shifting or settling of items or soil layers, and changes in the ground surface. Coherent change detection (CCD) means the detection of both amplitude and phase changes defined between two GPR images. CCD has the advantage of detecting changes that may otherwise remain undetected using incoherent techniques. A GPR system located on a mobile platform, such as a moving vehicle, can make two or more measurement passes over the same route, and therefore can examine the same underground region at different times. Consecutive passes are separated in time, for example, by less than a few hours to several months or more, according to the requirements of a particular application. GPR images of the underground region acquired for each pass are used to determine changes that occurred after a previous measurement pass.

The mobile CCD GPR system can be used for a variety of applications. For example, the system can be used for road and bridge inspection, including locating newly formed potholes in a road surface, locating road wear such as cracks, and detecting the presence of newly formed underground voids that can result in road collapse. Other system applications include tunnel detection, such as finding newly formed rodent tunnels and manmade cross-border tunnels, and land fill inspection, such as monitoring the flow of toxic fluids that can contaminate groundwater. Still other system applications include monitoring water tables and general geophysical surveying.

Figure 1:
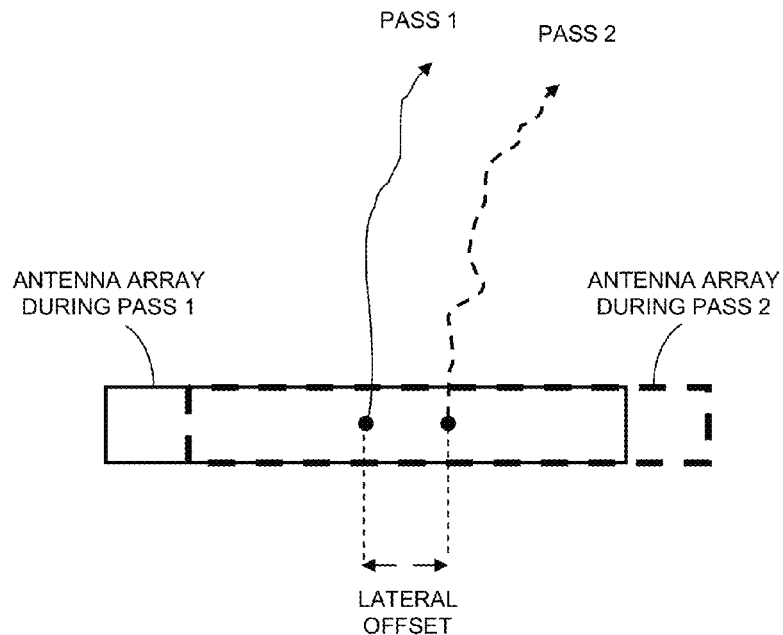
FIG. 1 is an illustration of the paths of the center location of a linear antenna array for a GPR system for two measurement passes.

Conventional GPR systems are limited, in part, by the inability of a vehicle or other mobile platform to identically retrace its path for each measurement pass. More particularly, the paths traversed for a GPR antenna array for two consecutive measurements along the same route are typically laterally and vertically offset. The offset generally varies with location along the route. By way of an example, FIG. 1 shows the paths of the center location of a linear antenna array for a GPR system for two consecutive passes. The example shows a second pass (dashed line) that is laterally offset to the right of a first pass (solid line). The lateral offset can vary with distance along the path and can be positive or negative (i.e., to the right or the left of the other pass). The actual path traversed by the antenna array is based on operator control of the vehicle and can be affected by surface features along the route. Other factors such as the antenna array separation from the ground surface, vehicle pitch, heading and roll are different between the two passes and serve to further complicate measurement capability. Change detection processing cannot be applied to standard coherent GPR measurement systems when pass-to-pass variations are present, such as lateral offsets that may be less than one foot.

Figure 2:
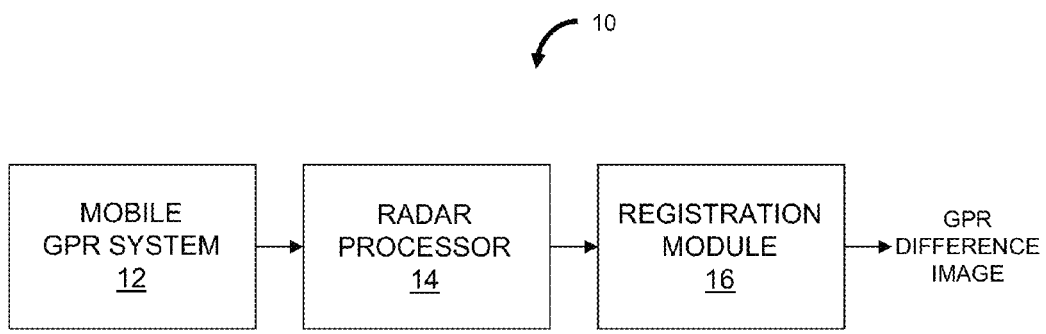
FIG. 2 is a block diagram of an embodiment of a coherent change detection GPR system according to the invention.

Referring to FIG. 2, embodiments of a CCD GPR system 10 include a mobile GPR system 12, a radar processor 14 and a registration module 16. The radar processor 14 receives raw radar data from the mobile GPR system 12 and provides GPR image data to the registration module 16 which generates a GPR difference image that includes data indicative of any changes to the surveyed underground region. In some embodiments, the registration module 16 includes a correlation processor. The CCD GPR system 10 has technical features that overcome the problems described above and that enable CCD GPR measurements for accurate detection of changes in the underground region. These features include coherent radar operation between measurement passes, the ability to accurately determine the path of the GPR antenna array during a measurement pass relative to the path of the GPR antenna array during an earlier pass, and a GPR antenna array that has spatially-invariant transmit and receive antenna elements. These key technical features are addressed independently below.

Coherent GPR Operation Between Measurement Passes

Various embodiments of the CCD GPR system are based on a radar transceiver architecture that maintains coherent operation over long periods of time and over large temperature variations. Temperature changes can occur for a variety of reasons, including operating at different times of day and operating during different seasons. The GPR system self-calibrates many times each second to prevent loss of coherence due, for example, to temperature changes in RF components and cables. In some embodiments, the calibration is performed at the scan rate of the antenna array. For example, if the scan rate of the antenna array is 70 Hz, the calibration rate is also 70 Hz. Calibration can be performed at higher or lower rates; however, a minimum acceptable calibration rate may be based on how quickly the temperature can change. For example, a calibration rate in the range of 0.01 Hz to 1 Hz is sufficient for most thermal environments.

Calibration is performed by switching the path of the RF signal to bypass the antenna elements. More specifically, a normal operating channel includes the transmitter, a transmitter antenna element, a receiver antenna element and the receiver. The corresponding calibration channel includes the transmitter and receiver, and a signal cable that extends from the transmitter to the antenna array and back to the receiver. To apply the calibration, each channel is adjusted by dividing the S-parameters of the antenna channels by the bypass signal. The S-parameters are complex and are represented in the frequency domain. For example, if the transmit pulses in one pass are stronger than the transmit pulses in the other pass, the difference is canceled by the division. By way of another example, an increase or decrease in phase due to thermal expansion or contraction of cables is properly calibrated out by the S-parameter division process.

To reduce the sensitivity of the GPR system to misalignment of the antenna array and changes in the separation from the ground surface, the radar is operated at low frequencies. In one embodiment, the GPR operating frequency range is within a frequency range extending from approximately 30 MHz to more than 400 MHz (e.g., within a VHF frequency range). Advantageously, lower RF frequencies improve the ground penetration capability of the GPR system.

The CCD GPR system can be operated on mobile platforms at different speeds. By way of a specific example, the CCD GPR system can be operated at 10 mph. As speed is increased, the signal to noise (SNR) decreases due to the reduced "stare time" for a resolution cell if the along-track resolution is maintained. In alternative embodiments, as speed is increased, the along-track resolution is decreased to maintain a constant SNR. Preferably, the speed is not increased beyond a limit at which the along-track resolution is equivalent to the cross-track resolution.

Determining the Location of the Antenna Array

The location of the antenna array is determined to an accuracy that is a small fraction of the wavelength $\lambda$ of the center frequency for the operating frequency range. In a preferred embodiment, the location of the antenna array is determined to an accuracy of approximately $$\frac{\lambda}{20}.$$

Thus for a GPR operating at VHF frequencies, the location is determined to an accuracy of several inches. General global positioning system (GPS) receivers do not meet the accuracy requirement.

In various embodiments, a co-registration method is used to register a current GPR image to a prior GPR image on a scan-by-scan basis. The method utilizes the uniqueness of sub-surface features to determine the current location of the antenna array relative to the location of the antenna array during a prior measurement pass. The method enables compensation for GPS errors and allows adjustment of the GPR image for height and roll to compensate for pass-to-pass differences in pitch, roll and height.

Figure 3:
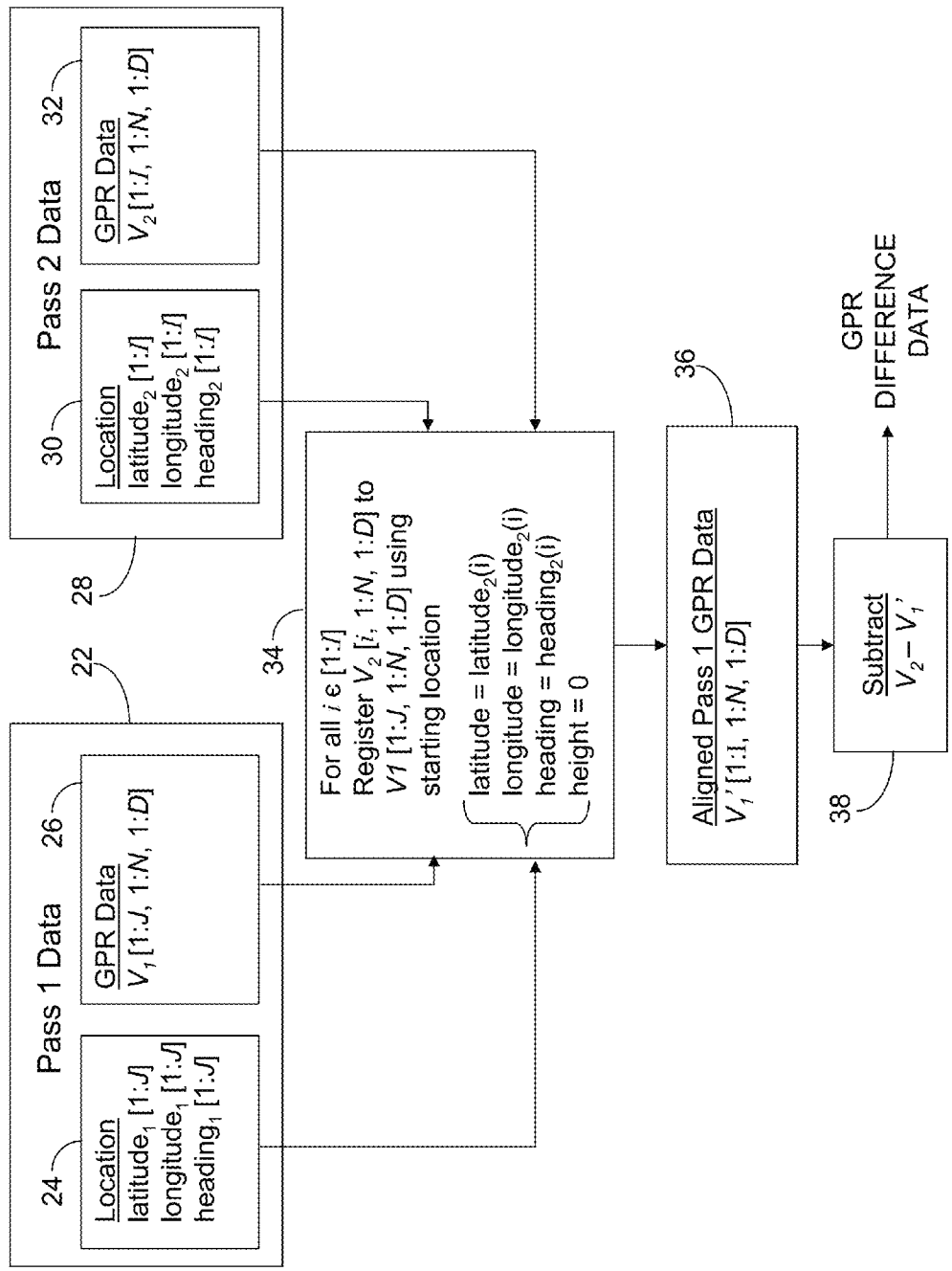
FIG. 3 is a flowchart representation of an embodiment of a method for generating a GPR difference image according to the invention.

FIG. 3 is a flowchart depicting the processing of acquired data 22 and 28 in an embodiment of a co-registration method according to the invention. According to the method, GPR scan data acquired during a second measurement pass (PASS 2) are registered to a GPR scan data acquired during a first measurement pass (PASS 1). The first pass means the immediately preceding measurement pass for the antenna array. The second pass means the next measurement pass for the antenna array along the same route. In alternative embodiments, one or more intervening passes can occur between the first and second passes according to the requirements of a specific application. For example, a first and third pass may occur during dry conditions while a second pass may occur during rain. It can be desirable to ignore the intervening second pass to exclude the effects of wet ground and to instead register the first and third passes.

Location data 24 for the antenna array during the first pass include the latitude, longitude and heading for the center of the antenna array for each scan j in a number J of scans acquired during the pass. The heading refers to the orientation of the array during a scan. The location data 24 are acquired by a GPS receiver rigidly mounted to the antenna array. GPR data (i.e., "radar data") 26 for the first pass are acquired as a time domain voltage $V_1$ received for each channel n at a depth d for each scan j. The voltage $V_1$ is recorded at different depths d to a maximum depth of D. Typically, the number of channels N is less than the number of antenna elements in the array.

Location data 30 are also acquired during the second pass. GPR data 32 for the second pass are acquired as a time domain voltage $V_2$ that is received for each channel n at a depth d for each scan i for a total number I of scans.

Figure 4:
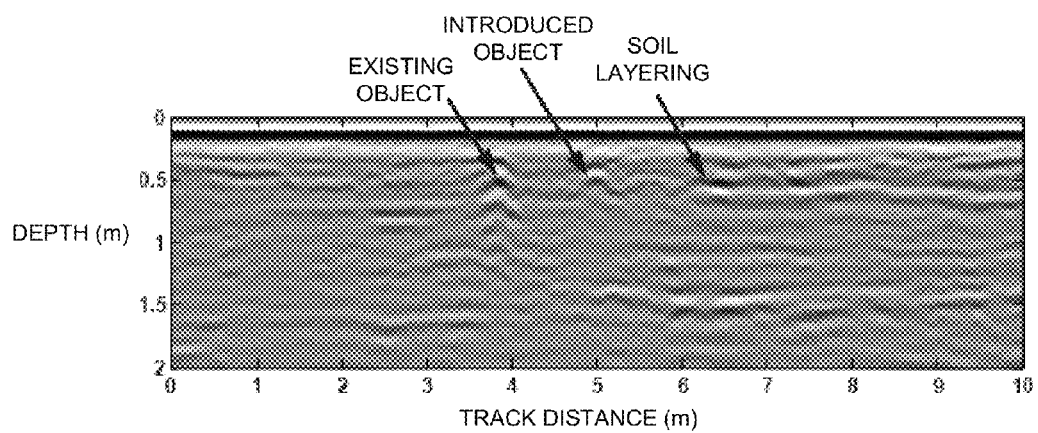
FIG. 4 is an example of a slice of a GPR image acquired during a single measurement pass.

FIG. 4 shows an example of a slice of a GPR image acquired during a single measurement pass. The underground region in the image is 10 m long and 2 m deep and corresponds to a single channel n having a cross-track resolution determined by the spacing of the antennal elements. The GPR voltage data are represented in the figure according to a gray scale. One feature in the GPR image indicates an existing object that is also present in a GPR image of an earlier measurement pass and another feature indicates an introduced object, that is, an object that is introduced into the sub-surface region subsequent to the earlier measurement pass. The effect of soil layering is also apparent in the slice of the GPR image. It should be noted that the feature for the introduced object cannot readily be distinguished from the feature for the existing object without additional processing using the earlier GPR image for the same underground region.

Reference is made again to FIG. 3. Due to variations in the location of the antenna array for corresponding scans in the two passes, the radar data $V_1$ for the first pass are registered 34 to the radar data $V_2$ for the second pass. The accuracy of the location data provided by the GPS receiver can substantially exceed the spacing of the antenna elements thus simply differencing the GPS data is not sufficient to determine the offset. For example, the location accuracy may be greater than 0.5 meter.

To achieve the desired radar data registration (a fraction of the antenna element spacing), the radar data $V_2$ for a scan i of the second pass is compared to the radar data $V_1$ from a corresponding scan j from the first pass. Initially, the GPS location data from the second pass is used as an initial guess to start the registration process. Preferably, an inertial navigation system and a Kalman filter are employed to achieve high local position accuracy. The radar data $V_2$ for the second pass are effectively displaced until a substantially optimum correlation is found for the scan i and the appropriate scan j in the radar data $V_1$ of the first pass. This displacement indicates the location of the antenna array during the scan i for the second pass relative to the location of the antenna array for the corresponding scan j for the first pass. Thus the radar data $V_1$ for the first pass is aligned 36, as a time domain voltage $V_1'$, that is registered to the radar data $V_2$ for the second pass. The resulting registered radar data $V_1'$ are subtracted 38 from the corresponding radar data $V_2$ to generate a GPR difference image.

In alternative embodiments, radar data registration is achieved through the use of a high-accuracy differential GPS (DGPS) system. Thus the search and correlation process described above is not performed and instead the radar data $V_2$ are displaced based directly on the DGPS data.

Antenna Array

The antenna array used for the GPR system is configured so that the pass-to-pass offsets described above can be compensated. In a preferred embodiment, the antenna array includes resistively loaded antenna elements. Each antenna element is spaced from a neighboring antenna element by a small fraction of the wavelength λ for the center frequency of the operating frequency range. For example, the spacing may be $$\frac{\lambda}{10}$$

so that for a system operating at VHF frequencies, the antenna element spacing can be a few inches to more than a foot. As a result of the $$\frac{\lambda}{10}$$

element spacing, each element on a given pass is offset by no more than $$\frac{\lambda}{20}$$

from one of the antenna elements on the previous pass, excluding the antenna elements on either end of the antenna array. If there is a substantial lateral offset between the two measurement passes, there may be a number N antenna elements in one scan that do not match up with corresponding shifted antenna elements in the other scan. In this instance, data corresponding to N antenna elements from one side of the antenna array in the earlier scan are ignored and data corresponding to N antenna elements from the opposite side of the antenna array are ignored in the later scan. Thus the number of channels of overlapping channels is reduced by N relative to two corresponding scans that have no lateral offset.

Figure 5:
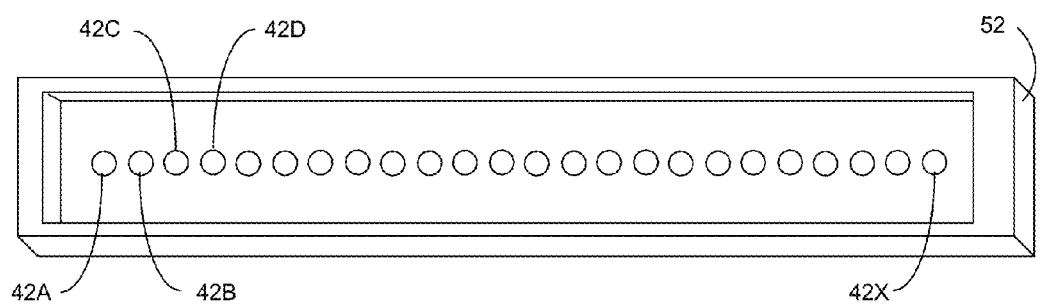
FIG. 5 illustrates an embodiment of a linear antenna array substantially enclosed by a box-shaped structure.

FIG. 5 is an illustration of an embodiment in which the antenna array includes a linear configuration of twenty four antenna elements 42A to 42X (generally 42). Each antenna element 42 is configured as part of a wide bandwidth and high dynamic range transceiver. In one embodiment, the transceivers have a dynamic range of approximately 90 dB.

At any moment during a scan, only one antenna element 42 is transmitting and only one antenna element 42 is receiving. In a preferred mode of operation, the antenna elements 42 that are simultaneously transmitting and receiving are separated by an inactive antenna element. For example, the first antenna element 42A transmits while the third antenna element 42C operates as a receive element. Subsequently, the second antenna element 42B transmits while the fourth antenna element 42D receives. This scan sequence in which the transmitting and receiving antenna elements are incremented in index by one continues until the last antenna element 42X at the end of the antenna array 40 operates as a receive element. The next scan starts by again transmitting with the first antenna element 42A and receiving with the third antenna element 42C. The scan rate can be established according to various factors, such as maximum platform speed, and desired SNR and along-track resolution. In one embodiment, the scan rate is approximately 70 Hz.

It should be recognized that other scan sequences are possible. For example, the first antenna element 42A can receive while the third antenna element 42C transmits, the second antenna element 42B then receives while the fourth antenna element 42D transmits, and so forth until the last antenna element 42X is used to transmit at the end of the scan sequence.

The inactive antenna element, or "dummy element", is a terminated element that effectively reduces the magnitude of the signal that is transmitted directly from the transmitting element to the receiving element. The directly coupled signal can be significant due to the close spacing of the antenna elements 42.

Preferably, the antenna array is disposed within a box-shaped structure 52 that acts as a backplane. The antenna elements 42 are visible through the open bottom side of the structure 52. The open side permits the transmit beams to pass downward toward the ground and enables the return signals to be received by the antenna elements 42. In addition, the structure 52 shields the antenna array from the environment and adverse effects from the vehicle or mobile platform. In some embodiments, the open side is covered with a material that is transparent in the operating frequency range of the GPR system.

An important property of the antenna array is shift invariance. More specifically, if the antenna array is shifted by an integer multiple of element spacings, the transmit beam from an antenna element 42 at a location before the shift is nearly identical to the transmit beam from a different antenna element 42 in the shifted antenna array at that location. Similarly, the receive pattern for an antenna element 42 at a location before the shift is nearly identical to the receive pattern for a different antenna element 42 in the shifted antenna array at that location. The similarities of the transmit beams and the receive patterns exist for both the near-field and the far-field. To achieve this desired shift property, the antenna array is constructed to address several concerns.

First, to suppress cavity modes that can be generated by the box-shaped structure 52, the inner surfaces of the structure 52 are covered with an RF attenuating dielectric material. In a preferred embodiment, the attenuating material is in the form of ferrite tiles attached to the inner surfaces. Ferrite has the advantage of providing significant attenuation at operating frequencies in limited space. Consequently, the size of the structure 52 is not substantially increased relative to a structure based on other types of RF absorbing materials. In an exemplary embodiment, the ferrite tile material is SN-20 available from Samwha USA Inc. of San Diego, Calif.

Second, every antenna element 42 is constructed in a similar manner such that the differences in the transmitted fields arising from manufacturing errors and tolerances are not significant. It is desirable to limit the differences in the transmitted field to −20 dB relative to the total field strength. To achieve this goal, component specifications and manufacturing techniques are addressed, for example, by using resistors with tolerances of 1% and by printing elements on printed circuit boards using repetitive manufacturing processes having tight tolerances.

Third, mutual coupling between antenna elements 42 can be problematic for antenna elements at the ends of the array. To reduce such effects, the antenna elements are resistively loaded so that the element to element mutual coupling decreases by at least 10 dB per antenna element.

CCD GPR Example Images

Figure 6:
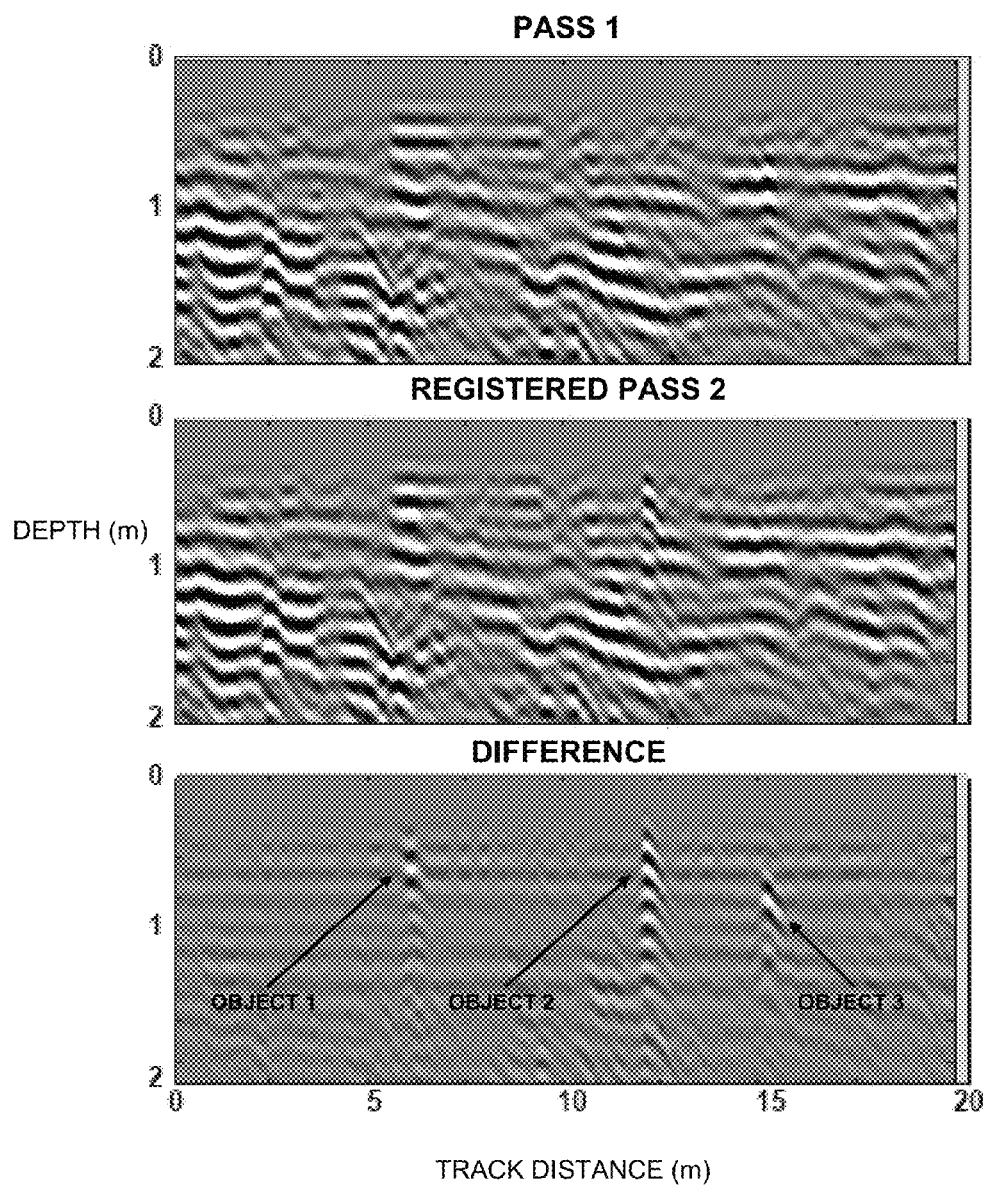
FIG. 6 shows an example of registered slices of a GPR image for a first measurement pass and a second measurement pass over a common underground region, and a GPR difference image generated from the registered GPR image slices according to an embodiment of the invention.

FIG. 6 shows registered slices of a GPR image for a first measurement pass and a second measurement pass over a common underground region according to an example. Also shown is a slice of a GPR difference image generated by differencing the data from the two registered image slices. In this example measurement, three objects were introduced into the underground region between the occurrence of the first and second measurement passes. The first object OBJECT 1 was buried just below the ground surface. The second object OBJECT 2 was placed on the ground surface and the third object OBJECT 3 was buried at a depth of one foot. Due to existing clutter in the underground region, it is not possible to determine the newly-introduced objects solely based on the second pass GPR image slice; however, the difference image substantially removes the pre-existing clutter features so that features due to the newly-introduced objects are readily observed.

Figure 7:
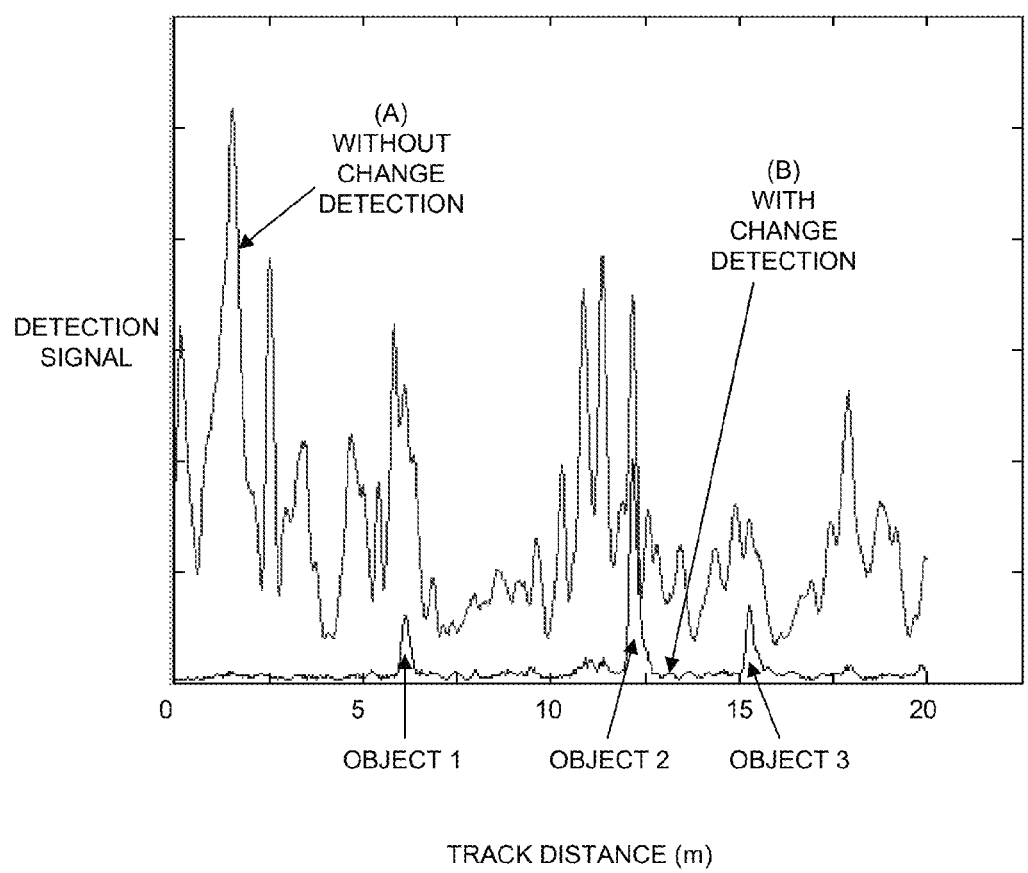
FIG. 7 is a graphical depiction of the integrated energy of the registered second pass of FIG. 6 and the integrated energy of the difference signal using change detection based on the full GPR image associated with FIG. 6.

FIG. 7 is a graphical illustration of (A) the integrated energy of the second pass and (B) the integrated energy of the difference signal using change detection for the full GPR image that corresponds to FIG. 6. In both cases, the signal is squared, integrated in depth and integrated across all channels. Although the features of the three introduced objects are not apparent from the second pass data image data alone, these features are clearly discernible in the integrated energy plot of the difference signal.

While the invention has been shown and described with reference to specific embodiments, it should be understood by those skilled in the art that various changes in form and detail may be made therein without departing from the spirit and scope of the invention.

What is claimed is:

1. A system for detecting and locating changes in an underground region, comprising:
    a mobile ground penetrating radar (GPR) system having a linear array of antenna elements each configured to transmit a radar signal into an underground region and to receive a return radar signal from the underground region, an electromagnetic field generated by each antenna element during transmission being substantially the same as an electromagnetic field generated by each of the other antenna elements during transmission and an antenna receive pattern of each antenna element during reception being substantially the same as an antenna receive pattern of each of the other antenna elements during reception;

a radar processor in communication with the GPR system and configured to generate a GPR image of an underground region; and a registration module in communication with the radar processor and configured to determine a lateral offset of the linear array between a pass over the underground region at a first time and a pass over the underground region at a second time, the registration module configured to spatially align a GPR image acquired for the first time and a GPR image acquired for the second time, and to generate a GPR difference image based on the spatially aligned GPR images, wherein the GPR difference image includes data representative of changes to the underground region that occur between the first and second times.

2. The system of claim 1 wherein the registration module comprises a correlation processor to determine the lateral offset from the GPR images at the first and second times.

3. The system of claim 1 wherein the registration module comprises a differential global positioning system (GPS) receiver.

4. The system of claim 1 wherein the antenna elements are resistively-loaded elements.

5. The system of claim 1 wherein a spacing of the antenna elements on the array does not exceed one-tenth of a center-frequency wavelength of the transmitted radar signal.

6. The system of claim 5 wherein the center-frequency wavelength of the transmitted radar signal is an effective wavelength for a pulse duration of the transmitted radar signal.

7. The system of claim 1 wherein the radar signal has a frequency in a VHF frequency range.

8. A method for determining a change to an underground region, comprising:

determining, at a processor module, a lateral offset between a ground penetrating radar (GPR) image of an underground region at a first time and a GPR image of the underground region at a second time;

applying, at the processor module, the lateral offset to one of the GPR images to generate a GPR shifted image; and generating, at the processor module, a GPR difference image based on the GPR shifted image and the other of the GPR images, wherein the GPR difference image includes data representative of changes to the underground region that occur between the first time and the second time.

9. The method of claim 8 wherein the determining of the lateral offset comprises performing an image correlation of the GPR images.

10. The method of claim 8 wherein the determining of the lateral offset comprises determining a difference in differential global positioning system data for a location of a GPR system that acquires the GPR image at the first time and the location of the GPR system when acquiring the GPR image at the second time.

11. The method of claim 8 further comprising performing, at the processor module, a squaring of the image data of the GPR difference image and an integration of the squared image data in depth.

* * * * *